US012183888B2

(12) United States Patent
Lee et al.

(10) Patent No.: US 12,183,888 B2
(45) Date of Patent: Dec. 31, 2024

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Jung Min Lee, Daejeon (KR); Young Min Lim, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 629 days.

(21) Appl. No.: 17/440,436

(22) PCT Filed: Mar. 20, 2020

(86) PCT No.: PCT/KR2020/003835
§ 371 (c)(1),
(2) Date: Sep. 17, 2021

(87) PCT Pub. No.: WO2020/190076
PCT Pub. Date: Sep. 24, 2020

(65) Prior Publication Data
US 2022/0166069 A1 May 26, 2022

(30) Foreign Application Priority Data
Mar. 21, 2019 (KR) ........................ 10-2019-0032472

(51) Int. Cl.
*H01M 10/0569* (2010.01)
*C07F 5/04* (2006.01)
*H01M 10/0525* (2010.01)

(52) U.S. Cl.
CPC ........... *H01M 10/0569* (2013.01); *C07F 5/04* (2013.01); *H01M 10/0525* (2013.01); *H01M 2300/0034* (2013.01); *H01M 2300/0037* (2013.01)

(58) Field of Classification Search
CPC .. H01M 10/0525; H01M 10/0569; C07F 5/04
See application file for complete search history.

(56) References Cited

U.S. PATENT DOCUMENTS

| | | | | |
|---|---|---|---|---|
| 6,783,896 B2 * | 8/2004 | Tsujioka | .......... | H01M 10/0568 252/62.2 |
| 10,998,579 B2 | 5/2021 | Lim et al. | | |
| 2013/0252113 A1 | 9/2013 | Yu et al. | | |
| 2014/0154591 A1 * | 6/2014 | Yokotsuji | .......... | H01M 10/0569 429/341 |
| 2014/0322616 A1 | 10/2014 | Onozaki et al. | | |
| 2015/0171476 A1 | 6/2015 | Onozaki et al. | | |
| 2016/0145190 A1 | 5/2016 | Bomkamp et al. | | |
| 2017/0237126 A1 | 8/2017 | Son et al. | | |
| 2018/0219259 A1 | 8/2018 | Kawai et al. | | |
| 2019/0074538 A1 | 3/2019 | Lee et al. | | |
| 2019/0237805 A1 * | 8/2019 | Lim | .................... | H01M 10/052 |

FOREIGN PATENT DOCUMENTS

| | | | |
|---|---|---|---|
| CN | 103733415 A | 4/2014 | |
| CN | 103855428 A | 6/2014 | |
| CN | 104737356 A | 6/2015 | |
| JP | 2007250288 A | 9/2007 | |
| JP | 2014011023 A | 1/2014 | |
| JP | 2017091850 A | 5/2017 | |
| JP | 2017107639 A | 6/2017 | |
| JP | 2018526763 A | 9/2018 | |
| KR | 20140071870 A | 6/2014 | |
| KR | 20140071945 A | 6/2014 | |
| KR | 20140145127 A | 12/2014 | |
| KR | 20160029065 A | 3/2016 | |
| KR | 20170094966 A | 8/2017 | |
| KR | 20170111745 A | 10/2017 | |
| KR | 20180089861 A | 8/2018 | |
| KR | 101938767 B1 | 1/2019 | |
| WO | 2015159824 A1 | 10/2015 | |
| WO | 2018135915 A1 | 7/2018 | |
| WO | WO-2018169370 A1 * | 9/2018 | ................ C07F 5/02 |

OTHER PUBLICATIONS

Extended European Search Report including Written Opinion for Application No. 20773309.8 dated Apr. 11, 2022, pp. 1-8.
Search report from International Application No. PCT/KR2020/003835, mailed Jun. 29, 2020.

* cited by examiner

*Primary Examiner* — Karie O'Neill Apicella
(74) *Attorney, Agent, or Firm* — Lerner David LLP

(57) ABSTRACT

A non-aqueous electrolyte solution for a lithium secondary battery and a lithium secondary battery including the same are disclosed herein. In some embodiments, a non-aqueous electrolyte solution includes a lithium salt, a fluorine-based linear ether solvent, a fluorine-based cyclic carbonate solvent, and a fluorine-based lithium compound, wherein the fluorine-based linear ether solvent and the fluorine-based cyclic carbonate solvent are present in a weight ratio of 6:4 to 9:1. In some embodiments, a lithium secondary battery having the non-aqueous electrolyte solvent has improved high-temperature storage characteristics.

13 Claims, No Drawings

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2020/003835, filed on Mar. 20, 2020, which claims priority from Korean Patent Application No. 10-2019-0032472, filed on Mar. 21, 2019, the disclosures of which are incorporated by reference herein.

TECHNICAL FIELD

The present invention relates to a non-aqueous electrolyte solution for a lithium secondary battery, in which a side reaction with an electrode is suppressed by ensuring oxidation stability, and a lithium secondary battery in which high-temperature storage characteristics are improved by including the same.

BACKGROUND ART

There is a need to develop technology for efficiently storing and utilizing electrical energy as personal IT devices and computer networks are developed with the development of information society and the accompanying dependency of society as a whole on the electrical energy is increased.

Among the technologies developed for this purpose, a technology based on secondary batteries is the most suitable technology for various applications. Since a secondary battery may be miniaturized to be applicable to a personal IT device and may be applied to an electric vehicle and a power storage device, there emerges an interest in the secondary battery. Among these secondary battery technologies, lithium ion batteries, which are battery systems having the theoretically highest energy density, are in the spotlight, and are currently being used in various devices.

Unlike the early days when lithium metal was directly applied to the system, the lithium ion battery is composed of a positive electrode formed of a transition metal oxide containing lithium, a negative electrode capable of storing lithium, an electrolyte solution, and a separator.

Among them, a significant amount of research on the electrolyte solution has been conducted while the electrolyte solution is known as a component that greatly affects stability and safety of the lithium ion battery.

The electrolyte solution for a lithium ion battery is composed of a lithium salt, an organic solvent dissolving the lithium salt, and a functional additive, wherein proper selection of these components is important to improve electrochemical properties of the battery.

A lithium secondary battery for an automobile is required to have high capacity and to be stably operated at high temperatures and a high voltage of 4.5 V or more.

However, since a carbonate-based organic solvent is mainly used as an electrolyte solution solvent, a side reaction with the electrode occurs or irreversible capacity due to oxidation decomposition is caused when the battery is stored for a long period of time at high temperature or is operated at a high voltage, and thus, it is not easy to secure a satisfactory operating voltage.

Therefore, there is a need to develop a non-aqueous electrolyte solution having high oxidation resistance in order to prepare a lithium secondary battery having excellent stability at high temperature and high voltage.

PRIOR ART DOCUMENT

Korean Patent Application Laid-open Publication No. 2018-0089861

DISCLOSURE OF THE INVENTION

Technical Problem

An aspect of the present invention provides a non-aqueous electrolyte solution for a lithium secondary battery in which a side reaction with an electrode is suppressed by ensuring oxidation stability.

Another aspect of the present invention provides a lithium secondary battery in which high-temperature storage characteristics are improved by including the non-aqueous electrolyte solution for a lithium secondary battery.

Technical Solution

According to an aspect of the present invention, there is provided a non-aqueous electrolyte solution for a lithium secondary battery which includes:
- a lithium salt,
- a fluorine-based linear ether solvent represented by the following Formula 1,
- a fluorine-based cyclic carbonate solvent, and
- a fluorine-based lithium compound represented by the following Formula 2,
- wherein the fluorine-based linear ether solvent and the fluorine-based cyclic carbonate solvent are included in a weight ratio of 6:4 to 9:1.

$$R_1\text{—}O\text{—}R_2 \qquad \text{[Formula 1]}$$

In Formula 1,
$R_1$ and $R_2$ are each independently an alkyl group having 1 to 10 carbon atoms which is substituted or unsubstituted with a fluorine element, but at least one of $R_1$ and $R_2$ is an alkyl group having 1 to 10 carbon atoms which is substituted with a fluorine element.

[Formula 2]

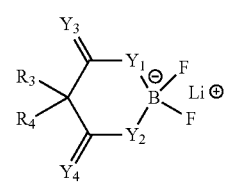

In Formula 2,
$Y_1$ to $Y_4$ are each independently oxygen (O) or sulfur (S), and
$R_3$ and $R_4$ are each independently hydrogen or fluorine.

According to another aspect of the present invention, there is provided a lithium secondary battery including the non-aqueous electrolyte solution for a lithium secondary battery of the present invention.

Advantageous Effects

In the present invention, a non-aqueous electrolyte solution for a lithium secondary battery, which includes a fluorine-based organic solvent and a fluorine-based lithium compound, but does not include a non-fluorine-based organic solvent, may be provided to prevent a side reaction between an electrode and the electrolyte solution during charge and discharge or storage at high temperatures. Also, a lithium secondary battery, in which high-temperature storage characteristics are improved by including the non-aqueous electrolyte solution, may be achieved.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Non-Aqueous Electrolyte Solution for Lithium Secondary Battery

According to the present specification, provided is a non-aqueous electrolyte solution for a lithium secondary battery which has a novel configuration, and the non-aqueous electrolyte solution includes a lithium salt, a fluorine-based linear ether solvent represented by the following Formula 1, a fluorine-based cyclic carbonate solvent, and a fluorine-based lithium compound represented by the following Formula 2, wherein the fluorine-based linear ether solvent and the fluorine-based cyclic carbonate solvent are included in a weight ratio of 6:4 to 9:1.

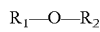  [Formula 1]

In Formula 1,
$R_1$ and $R_2$ are each independently an alkyl group having 1 to 10 carbon atoms which is substituted or unsubstituted with a fluorine element, but at least one of $R_1$ and $R_2$ is an alkyl group having 1 to 10 carbon atoms which is substituted with a fluorine element.

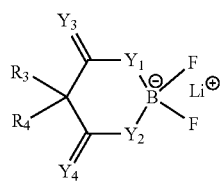 [Formula 2]

In Formula 2,
$Y_1$ to $Y_4$ are each independently oxygen (O) or sulfur (S), and
$R_3$ and $R_4$ are each independently hydrogen or fluorine.

In this case, the non-aqueous electrolyte solution for a lithium secondary battery of the present invention is characterized in that it does not include a non-fluorine-based carbonate-based solvent as a non-aqueous electrolyte solution component.

(1) Lithium Salt

First, in the non-aqueous electrolyte solution for a lithium secondary battery of the present invention, any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $ClO_4^-$, $BF_4^-$, $B_{10}Cl_{10}^-$, $PF_6^-$, $CF_3SO_3^-$, $CH_3CO_2^-$, $CF_3CO_2^-$, $AsF_6^-$, $SbF_6^-$, $AlCl_4^-$, $AlO_4^-$, $CH_3SO_3^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $C_4F_9SO_3^-$, $CF_3CF_2SO_3^-$, $(FSO_2)_2N^-$, $(CF_3SO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $SCN^-$, and $(CF_3CF_2SO_2)_2N^-$ as an anion.

Specifically, the lithium salt may include a single material selected from the group consisting of LiCl, LiBr, LiI, LiClO$_4$, LiBF$_4$, LiB$_{10}$Cl$_{10}$, LiPF$_6$, LiCF$_3$SO$_3$, LiCH$_3$CO$_2$, LiCF$_3$CO$_2$, LiAsF$_6$, LiSbF$_6$, LiAlCl$_4$, LiAlO$_4$, LiCH$_3$SO$_3$, LiFSI (lithium bis(fluorosulfonyl) imide, LiN(SO$_2$F)$_2$), LiTFSI (lithium bis(trifluoromethanesulfonyl)imide, LiN(SO$_2$CF$_3$)$_2$), and LiBETI (lithium bis(perfluoroethanesulfonyl)imide, LiN(SO$_2$C$_2$F$_5$)$_2$), or a mixture of two or more thereof. More specifically, the lithium salt may include a single material selected from the group consisting of LiBF$_4$, LiPF$_6$, LiCH$_3$CO$_2$, LiCF$_3$CO$_2$, LiCH$_3$SO$_3$, LiFSI, LiTFSI, and LiBETI, or a mixture of two or more thereof. In addition to them, a lithium salt commonly used in an electrolyte solution of a lithium secondary battery may be used without limitation.

The lithium salt may be appropriately changed in a normally usable range, but may be included in a concentration of 0.8 M to 4.0 M, for example, 1.0 M to 3.0 M in the electrolyte solution to obtain an optimum effect of forming a film for preventing corrosion of a surface of an electrode.

In a case in which the concentration of the lithium salt is less than 0.8 M, an effect of improving low-temperature output and cycle characteristics during high-temperature storage of the lithium secondary battery is insignificant, and, in a case in which the concentration of the lithium salt is greater than 4.0 M, electrolyte solution impregnability may be reduced due to an increase in viscosity of the non-aqueous electrolyte solution.

(2) Fluorine-Based Solvent

According to the present specification, the non-aqueous electrolyte solution for a lithium secondary battery includes a fluorine-based solvent as a main solvent.

The fluorine-based solvent may include a fluorine-based linear ether solvent represented by the following Formula 1 and a fluorine-based cyclic carbonate solvent.

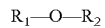 [Formula 1]

In Formula 1,
$R_1$ and $R_2$ are each independently an alkyl group having 1 to 10 carbon atoms which is substituted or unsubstituted with a fluorine element, but at least one of $R_1$ and $R_2$ is an alkyl group having 1 to 10 carbon atoms which is substituted with a fluorine element.

In Formula 1, $R_1$ and $R_2$ are each independently an alkyl group having 2 to 8 carbon atoms which is substituted or unsubstituted with a fluorine element, but at least one of $R_1$ and $R_2$ may be an alkyl group having 2 to 8 carbon atoms which is substituted with a fluorine element. Specifically, in Formula 1, $R_1$ and $R_2$ are each independently an alkyl group having 2 to 5 carbon atoms which is substituted or unsubstituted with a fluorine element, but at least one of $R_1$ and $R_2$ may be an alkyl group having 2 to 5 carbon atoms which is substituted with a fluorine element.

More specifically, the fluorine-based linear ether solvent may include at least one selected from the group consisting of 1,1,2,2-tetrafluoroethyl 2,2,2-trifluoroethyl ether (TFET-FEE), 1,1,2,2-tetrafluoroethyl 2,2,3,3-tetrafluoropropyl ether (TFETFPE), and 1H, 1H, 5H-octafluoropentyl 1,1,2, 2-tetrafluoroethyl ether (or it may be referred to as 1H, 1H, 5H-perfluoropentyl 1,1,2,2-tetrafluoroethyl ether), and may specifically be 1,1,2,2-tetrafluoroethyl 2,2,3,3-tetrafluoropropyl ether.

Also, the fluorine-based cyclic carbonate solvent may include fluoroethylene carbonate (FEC) or difluoroethylene carbonate (DFEC), and specifically, may include fluoroethylene carbonate.

Currently, most secondary batteries use a non-fluorine-based carbonate solvent as a main solvent of a non-aqueous electrolyte solution, wherein the solvent may transform a stable structure of the battery, for example, a swelling phenomenon occurs because gas is generated due to oxidation of the electrolyte solution when the solvent is generally stored for a long period of time at high temperature. Furthermore, since a reaction heat generated by a side reaction between an electrode and the non-fluorine-based carbonate solvent increases internal temperature of the battery and, when the temperature reaches a temperature above an ignition point, surrounding oxygen is combined to lead to a thermal-runaway phenomenon, the secondary battery may ignite and explode.

Thus, the present invention is characterized in that a fluorine-based solvent with excellent electrochemical stability is only included as a main solvent instead of including a non-fluorine-based carbonate solvent with poor oxidation stability as a non-aqueous electrolyte solution solvent. That is, since the fluorine-based solvent has high oxidation stability and forms LiF, which is stable even at a high voltage, on a film component, the side reaction between the non-aqueous electrolyte solution and the electrode, particularly a positive electrode, may be prevented during operation (charge and discharge) at a high voltage or during high-temperature storage.

As the fluorine-based solvent, the fluorine-based linear ether solvent and the fluorine-based cyclic carbonate solvent may be included as a main solvent.

That is, a fluorine-based cyclic ether solvent may contribute to improve a dielectric constant due to a large amount of the cyclic solvent in the electrolyte solution, but is disadvantageous in that mobility of lithium ions is reduced while having high-viscosity properties. Thus, it is desirable to use the fluorine-based linear ether solvent instead of the fluorine-based cyclic ether solvent in order to ensure high ionic conductivity properties. Also, it is desirable to use the fluorine-based cyclic carbonate solvent having a higher dielectric constant than a fluorine-based linear carbonate solvent.

Since the fluorine-based linear ether solvent and the fluorine-based cyclic carbonate solvent may be mixed in a weight ratio of 6:4 to 9:1, particularly 7:3 to 9:1, and more particularly 8:2 to 9:1, and included, a performance improvement effect may be achieved during high-voltage and high-temperature storage.

In the present invention, since the fluorine-based cyclic carbonate solvent is combined with the fluorine-based linear ether solvent within the above range and used as the main solvent of the non-aqueous electrolyte solution to ensure high ionic conductivity properties of the lithium secondary battery, the dielectric constant of the non-aqueous electrolyte solution is increased and, as a result, a degree of dissociation of the lithium salt may be increased to ensure the ionic conductivity performance of the electrolyte solution. If the weight ratio of the fluorine-based linear ether solvent is less than 6, that is, the weight ratio of the fluorine-based cyclic carbonate solvent is greater than 4, since the non-aqueous electrolyte solution becomes highly viscous, the mobility of the lithium ions may be reduced. Also, if the weight ratio of the fluorine-based linear ether solvent is greater than 9, that is, the weight ratio of the fluorine-based cyclic carbonate solvent included is less than 1, the dielectric constant of the non-aqueous electrolyte solution may be reduced to reduce the degree of dissociation of the lithium salt.

(3) Fluorine-Based Lithium Compound

Also, according to the present specification, the non-aqueous electrolyte solution for a lithium secondary battery of the present invention includes a fluorine-based lithium compound represented by the following Formula 2 as an additive.

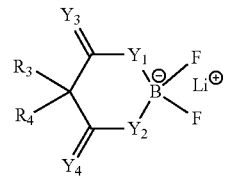

[Formula 2]

In Formula 2,
$Y_1$ to $Y_4$ are each independently O or S, and
$R_3$ and $R_4$ each are hydrogen or fluorine.

The fluorine-based lithium compound is a compound able to provide a synergistic effect on the improvement of the performance of the lithium secondary battery by the fluorine-based linear ether solvent as described above, wherein it may form a uniform and thin film on a positive electrode and a negative electrode.

That is, the fluorine-based lithium compound may improve durability of the battery by mainly forming a positive electrode solid electrolyte interface (SEI) to reduce a positive electrode reaction of other materials and thus forming a uniform and thin film. Also, the fluorine-based lithium compound may play a complementary role in forming a SEI on a surface of the negative electrode in addition to the effect induced by the fluorine-based linear ether solvent, may play a role in suppressing the decomposition of the solvent in the electrolyte, and may improve the mobility of the lithium ions.

Specifically, the fluorine-based lithium compound may be a compound represented by Formula 2a below.

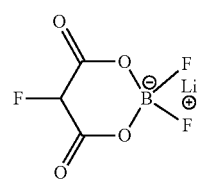

[Formula 2a]

The fluorine-based lithium compound may be appropriately used according to an amount of the non-aqueous electrolyte solution additive generally added to the non-aqueous electrolyte solution, and, for example, may be included in an amount of 0.05 wt % to 3.0 wt %, for example, 0.1 wt % to 1.0 wt % based on a total weight of the non-aqueous electrolyte solution for a lithium secondary battery.

In a case in which the fluorine-based lithium compound is included in an amount within the above range, a robust SEI may be stably formed on the positive electrode and the negative electrode, and the resulting effect may be obtained.

If the amount of the fluorine-based lithium compound is less than 0.05 wt %, a film-forming effect by the additive may be insignificant, and, if the amount of the fluorine-based lithium compound is greater than 3 wt %, resistance may be increased during high-temperature storage due to a side reaction caused by decomposition of the excessive amount of the additive.

Thus, in a case in which the additive is included in an amount of 0.05 wt % or more, for example, 0.1 wt % or more, and is included in an amount of 3 wt % or less, for example, 1.0 wt %, the additive may achieve a stable film-forming effect on the surfaces of the positive electrode and the negative electrode while suppressing disadvantages, such as the side reaction caused by the additive, capacity reduction, and resistance increase, as much as possible.

(4) Fluorine-Based Solvent

The non-aqueous electrolyte solution for a lithium secondary battery according to the present specification may further include a fluorine-based solvent.

The fluorine-based solvent may include at least one selected from the group consisting of a fluorine-based linear carbonate solvent, a fluorine-based dioxolane solvent, a fluorine-based phosphite solvent, a fluorine-based phosphate solvent, a fluorine-based benzene solvent, a fluorine-based cyclic ether solvent, a fluorine-based propionate solvent, and a fluorine-based acetate solvent.

The fluorine-based linear carbonate solvent may include at least one selected from the group consisting of fluorodimethyl carbonate (F-DMC), fluoroethyl methyl carbonate (FEMC), and methyl 2,2,2-trifluoroethyl carbonate (F3-EMC).

Also, the fluorine-based dioxolane solvent may include 2,2-bis(trifluoromethyl)-1,3-dioxolane (TFDOL).

The fluorine-based phosphite solvent may include tris (trifluoroethyl)phosphite (TFEPi).

The fluorine-based phosphate solvent may include tris(2, 2,2-trifluoroethyl)phosphate (TFEPa).

The fluorine-based benzene solvent may include at least one selected from the group consisting of monofluorobenzene (FB), difluorobenzene, trifluorobenzene, tetrafluorobenzene, pentafluorobenzene, and hexafluorobenzene.

The fluorine-based propionate solvent may include at least one selected from the group consisting of methyl 3,3,3-trifluoropropionate (3-FMP), methyl 2,3,3,3-tetrafluoropropionate (4-FMP), and methyl pentafluoropropionate.

The fluorine-based acetate solvent may include at least one selected from the group consisting of methyl difluoroacetate, ethyl difluoroacetate, and difluoroethyl acetate.

In the non-aqueous electrolyte solution for a lithium secondary battery of the present invention, a weight ratio of a mixed solvent of the fluorine-based linear ether solvent and the fluorine-based cyclic carbonate solvent:the fluorine-based solvent may be in a range of 1:0 to 1:1.

In a case in which the weight ratio satisfies the above range, since capacity retention at high temperature may be improved and an amount of gas generated during high-temperature storage may be suppressed, an improvement in high-temperature storage characteristics may be expected. That is, a non-aqueous electrolyte solution able to satisfy both battery performance and cycle characteristics at high temperature and high voltage may be achieved by controlling the weight ratio of the mixed solvent of the fluorine-based linear ether solvent and the fluorine-based cyclic carbonate solvent to the fluorine-based solvent further included, and the non-aqueous electrolyte solution may be more likely to be achieved if the weight ratio falls within a preferred range in the above range.

(5) Fluorinated Compound

The non-aqueous electrolyte solution for a lithium secondary battery according to the present specification may further include other fluorinated compounds in addition to the fluorine-based lithium compound represented by Formula 2.

An additive containing at least one fluorine element, which is generally used in a non-aqueous electrolyte of a lithium secondary battery, as a compound able to provide a synergistic effect on the improvement of the performance of the lithium secondary battery by the fluorine-based lithium compound represented by Formula 2 as described above, may be used as the fluorinated compound.

Specifically, the fluorinated compound may include at least one selected from the group consisting of a fluorinated nitrile-based compound, a fluorinated lithiated phosphate-based compound, and a fluorinated lithiated borate-based compound.

In this case, the fluorinated nitrile-based compound may include at least one selected from the group consisting of 2-fluorobenzonitrile, 4-fluorobenzonitrile, difluorobenzonitrile, and trifluorobenzonitrile.

The fluorinated lithiated phosphate-based compound may include at least one selected from the group consisting of lithium difluoro(bisoxalato)phosphate and lithium difluorophosphate ($LiPO_2F_2$).

The fluorinated lithiated borate-based compound may include at least one selected from the group consisting of lithium tetrafluoroborate ($LiBF_4$) and lithium difluoro(oxalato)borate (LiODFB), except for the fluorine-based lithium compound represented by Formula 2.

Two or more of the fluorinated compounds may be mixed and used, and the fluorinated compounds may be included in an amount of 10 wt % or less, particularly 0.05 wt % to 5.0 wt %, and more particularly 0.1 wt % to 5.0 wt % based on the total weight of the non-aqueous electrolyte solution for a secondary battery.

In a case in which the amount of the fluorinated compounds is greater than 10 wt %, a side reaction in the electrolyte solution may excessively occur during charge and discharge of the battery. Particularly, if the excessive amount of the fluorinated compounds is added, since the fluorinated compounds may not be sufficiently decomposed at high temperatures so that the fluorinated compounds may be present in the form of an unreacted material or precipitates in the electrolyte solution at room temperature, a side reaction may occur in which lifetime or resistance characteristics of the secondary battery are degraded. In a case in which the amount of the fluorinated compounds is less than 0.05 wt %, an effect of improving low-temperature output, high-temperature storage characteristics, and high-temperature life characteristics of the battery according to the use of the fluorinated compounds may be insignificant.

(6) Others

The non-aqueous electrolyte solution for a lithium secondary battery according to the present specification is characterized in that it does not include a non-fluorine-based carbonate-based solvent. Specifically, the non-fluorine-based carbonate-based solvent may include a cyclic carbonate-based organic solvent or a linear carbonate-based organic solvent.

The cyclic carbonate-based organic solvent is a highly viscous organic solvent, wherein specific examples of the cyclic carbonate-based organic solvent may be ethylene carbonate (EC), propylene carbonate (PC), 1,2-butylene carbonate, 2,3-butylene carbonate, 1,2-pentylene carbonate, 2,3-pentylene carbonate, or vinylene carbonate.

The linear carbonate-based organic solvent is an organic solvent having low viscosity and low permittivity, wherein typical examples of the linear carbonate-based organic solvent may be dimethyl carbonate (DMC), diethyl carbonate (DEC), dipropyl carbonate, ethyl methyl carbonate (EMC), methylpropyl carbonate, or ethylpropyl carbonate.

Since the non-fluorine-based carbonate-based solvent as described above has low oxidation stability, gas may be generated by the side reaction with the electrode during high-temperature storage or high-voltage operation driving to reduce stability of the lithium secondary battery. Thus, it is desirable to not include the non-fluorine-based carbonate-based solvent in the non-aqueous electrolyte solution in terms of improving the performance of the secondary battery.

Lithium Secondary Battery

Also, in another embodiment of the present invention, there is provided a lithium secondary battery including the non-aqueous electrolyte solution for a lithium secondary battery of the present invention.

The lithium secondary battery of the present invention may be prepared according to a typical method known in the art, and, specifically, after an electrode assembly, in which a positive electrode, a negative electrode, and a separator disposed between the positive electrode and the negative electrode are sequentially stacked, is formed and accommodated in a battery case, the lithium secondary battery of the present invention may be prepared by injecting the non-aqueous electrolyte solution of the present invention. Each component constituting the lithium secondary battery is the same as described below.

(1) Positive Electrode

The positive electrode may be prepared by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included. Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement effect due to the control of types and content ratios of components constituting the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 80 wt % to 99 wt %, for example, 90 wt % to 99 wt %, based on a total weight of solid content in the positive electrode slurry. In a case in which the amount of the positive electrode active material is 80 wt % or less, since energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer, a styrene-butadiene rubber, a fluoro rubber, various copolymers thereof, and the like.

Also, the conductive agent is a material providing conductivity without causing adverse chemical changes in the battery, wherein it may be added in an amount of 1 wt % to 20 wt % based on the total weight of the solid content in the positive electrode slurry.

As a typical example of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Furthermore, the solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of the solid content in the positive electrode slurry including the positive electrode active material as well as optionally the binder and the conductive agent is in a range of 10 wt % to 60 wt %, for example, 20 wt % to 50 wt %.

(2) Negative Electrode

The negative electrode may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x \leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content in the negative electrode slurry including the negative electrode active material as well as optionally the binder and the conductive agent is in a range of 50 wt % to 75 wt %, for example, 50 wt % to 65 wt %.

(3) Separator

As the separator included in the lithium secondary battery of the present invention, a typical porous polymer film generally used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Preparation of Non-Aqueous Electrolyte Solution for Lithium Secondary Battery)

A fluorine-based solvent was prepared by mixing 1,1,2, 2-tetrafluoroethyl 2,2,3,3-tetrafluoropropyl ether and fluoroethylene carbonate in a weight ratio of 7:3 and dissolving $LiPF_6$ such that a concentration of the $LiPF_6$ was 1.2 M. A non-aqueous electrolyte solution for a lithium secondary battery was prepared by adding 0.1 g of the compound represented by Formula 2a to 99.9 g of the fluorine-based organic solvent (see Table 1 below).

(Lithium Secondary Battery Preparation)

A positive electrode active material ($LiNi_{0.6}Co_{0.2}Mn_{0.2}O_2$; NCM), a conductive agent (carbon black), and a binder (polyvinylidene fluoride) were added to N-methyl-2-pyrrolidone (NMP) at a weight ratio of 97.5:1:1.5 to prepare a positive electrode slurry (solid content: 50 wt %). A 12 μm thick aluminum (Al) thin film, as a positive electrode collector, was coated with the positive electrode slurry, dried, and then roll-pressed to prepare a positive electrode.

A negative electrode active material (SiO:graphite=5:95 weight ratio), a binder (SBR-CMC), and a conductive agent (carbon black) were added in a weight ratio of 95:3.5:1.5 to water, as a solvent, to prepare a negative electrode mixture slurry (solid content: 60 wt %). A 6 μm thick copper (Cu) thin film, as a negative electrode collector, was coated with the negative electrode mixture slurry, dried, and then roll-pressed to prepare a negative electrode.

An electrode assembly was prepared by sequentially stacking the positive electrode, a polyolefin-based porous separator coated with inorganic particles ($Al_2O_3$), and the negative electrode.

The electrode assembly was accommodated in a pouch-type battery case, and the electrolyte solution for a lithium secondary battery was injected thereinto to prepare a pouch-type lithium secondary battery.

Example 2

A non-aqueous electrolyte solution for a lithium secondary battery and a lithium secondary battery including the same were prepared in the same manner as in Example 1 except that 1 g of the compound represented by Formula 2a was added to 99 g of the fluorine-based solvent to prepare the non-aqueous electrolyte solution for a lithium secondary battery (see Table 1 below).

Example 3

A non-aqueous electrolyte solution for a lithium secondary battery and a lithium secondary battery including the same were prepared in the same manner as in Example 1 except that 3 g of the compound represented by Formula 2a was added to 97 g of the fluorine-based solvent to prepare the non-aqueous electrolyte solution for a lithium secondary battery (see Table 1 below).

Example 4

(Preparation of Non-Aqueous Electrolyte Solution for Lithium Secondary Battery)

A fluorine-based solvent was prepared by mixing a fluorine-based mixed solvent (1,1,2,2-tetrafluoroethyl 2,2,3,3-tetrafluoropropyl ether:fluoroethylene carbonate=7:3 weight ratio) and methyl 2,2,2-trifluoroethyl carbonate in a weight ratio of 1:0.7 and dissolving $LiPF_6$ such that a concentration of the $LiPF_6$ was 1.2 M. A non-aqueous electrolyte solution for a lithium secondary battery was prepared by adding 1 g of the compound represented by Formula 2a to 99 g of the fluorine-based solvent (see Table 1 below).

(Lithium Secondary Battery Preparation)

A lithium secondary battery was prepared in the same manner as in Example 1 except that the above-prepared non-aqueous electrolyte solution for a lithium secondary battery was injected.

Example 5

A non-aqueous electrolyte solution for a lithium secondary battery and a lithium secondary battery including the same were prepared in the same manner as in Example 4 except that fluorobenzene was used instead of the methyl 2,2,2-trifluoroethyl carbonate (see Table 1 below).

Example 6

A non-aqueous electrolyte solution for a lithium secondary battery and a lithium secondary battery including the same were prepared in the same manner as in Example 4 except that methyl 3,3,3-trifluoropropionate was used instead of the methyl 2,2,2-trifluoroethyl carbonate (see Table 1 below).

Example 7

A non-aqueous electrolyte solution for a lithium secondary battery and a lithium secondary battery including the same were prepared in the same manner as in Example 1 except that 1 g of the compound represented by Formula 2a and 2 g of $LiBF_4$ were added to 97 g of the fluorine-based solvent (see Table 1 below).

Example 8

(Preparation of Non-Aqueous Electrolyte Solution for Lithium Secondary Battery)

A fluorine-based solvent was prepared by mixing 1,1,2, 2-tetrafluoroethyl 2,2,3,3-tetrafluoropropyl ether and fluoroethylene carbonate in a weight ratio of 6:4 and dissolving $LiPF_6$ such that a concentration of the $LiPF_6$ was 1.2 M. A non-aqueous electrolyte solution for a lithium secondary battery was prepared by adding 1 g of the compound represented by Formula 2a to 99 g of the fluorine-based organic solvent (see Table 1 below).

(Lithium Secondary Battery Preparation)

A lithium secondary battery was prepared in the same manner as in Example 1 except that the above-prepared non-aqueous electrolyte solution for a lithium secondary battery was injected.

Example 9

(Preparation of Non-Aqueous Electrolyte Solution for Lithium Secondary Battery)

A fluorine-based solvent was prepared by mixing 1,1,2,2-tetrafluoroethyl 2,2,3,3-tetrafluoropropyl ether and fluoroethylene carbonate in a weight ratio of 9:1 and dissolving $LiPF_6$ such that a concentration of the $LiPF_6$ was 1.2 M. A non-aqueous electrolyte solution for a lithium secondary battery was prepared by adding 1 g of the compound represented by Formula 2a to 99 g of the fluorine-based organic solvent (see Table 1 below).

(Lithium Secondary Battery Preparation)

A lithium secondary battery was prepared in the same manner as in Example 1 except that the above-prepared non-aqueous electrolyte solution for a lithium secondary battery was injected.

Example 10

A non-aqueous electrolyte solution for a lithium secondary battery and a lithium secondary battery including the same were prepared in the same manner as in Example 1 except that 4 g of the compound represented by Formula 2a was added to 96 g of the fluorine-based solvent (see Table 1 below).

Comparative Example 1

(Preparation of Non-Aqueous Electrolyte Solution for Lithium Secondary Battery)

A non-fluorine-based solvent was prepared by mixing ethylene carbonate and ethyl methyl carbonate in a weight ratio of 3:7 and dissolving $LiPF_6$ such that a concentration of the $LiPF_6$ was 1.2 M. A non-aqueous electrolyte solution for a lithium secondary battery was prepared by adding 1 g of the compound represented by Formula 2a to 99 g of the non-fluorine-based organic solvent (see Table 1 below).

(Lithium Secondary Battery Preparation)

A lithium secondary battery was prepared in the same manner as in Example 1 except that the above-prepared non-aqueous electrolyte solution for a lithium secondary battery was injected.

Comparative Example 2

A non-aqueous electrolyte solution for a lithium secondary battery and a lithium secondary battery including the same were prepared in the same manner as in Comparative Example 1 except that 1 g of the compound represented by Formula 2a and 2 g of $LiBF_4$ were added to 97 g of the non-fluorine-based organic solvent (see Table 1 below).

Comparative Example 3

(Preparation of Non-Aqueous Electrolyte Solution for Lithium Secondary Battery)

A mixed solvent was prepared by mixing 1,1,2,2-tetrafluoroethyl 2,2,3,3-tetrafluoropropyl ether, ethylene carbonate, and ethyl methyl carbonate in a weight ratio of 4:3:3 and dissolving $LiPF_6$ such that a concentration of the $LiPF_6$ was 1.2 M. A non-aqueous electrolyte solution for a lithium secondary battery was prepared by adding 1 g of the compound represented by Formula 2a to 99 g of the mixed solvent (see Table 1 below).

(Lithium Secondary Battery Preparation)

A lithium secondary battery was prepared in the same manner as in Example 1 except that the above-prepared non-aqueous electrolyte solution for a lithium secondary battery was injected.

Comparative Example 4

(Preparation of Non-Aqueous Electrolyte Solution for Lithium Secondary Battery)

A mixed solvent was prepared by mixing 1,1,2,2-tetrafluoroethyl 2,2,3,3-tetrafluoropropyl ether and ethylene carbonate in a weight ratio of 7:3 and dissolving $LiPF_6$ such that a concentration of the $LiPF_6$ was 1.2 M. A non-aqueous electrolyte solution for a lithium secondary battery was prepared by adding 1 g of the compound represented by Formula 2a and 2 g of $LiBF_4$ to 97 g of the mixed solvent (see Table 1 below).

(Lithium Secondary Battery Preparation)

A lithium secondary battery was prepared in the same manner as in Example 1 except that the above-prepared non-aqueous electrolyte solution for a lithium secondary battery was injected.

Comparative Example 5

A non-aqueous electrolyte solution for a lithium secondary battery and a lithium secondary battery including the same were prepared in the same manner as in Example 1 except that 2 g of $LiBF_4$ was added to 98 g of the fluorine-based solvent to prepare the non-aqueous electrolyte solution for a lithium secondary battery (see Table 1 below).

Comparative Example 6

(Preparation of Non-Aqueous Electrolyte Solution for Lithium Secondary Battery)

A fluorine-based solvent was prepared by mixing fluoroethylene carbonate and methyl 2,2,2-trifluoroethyl carbonate in a weight ratio of 1:0.7, instead of including a fluorine-based linear ether solvent, and dissolving $LiPF_6$ such that a concentration of the $LiPF_6$ was 1.2 M. A non-aqueous electrolyte solution for a lithium secondary battery was prepared by adding 1 g of the compound represented by Formula 2a and 2 g of $LiBF_4$ to 97 g of the fluorine-based solvent (see Table 1 below).

(Lithium Secondary Battery Preparation)

A lithium secondary battery was prepared in the same manner as in Example 1 except that the above-prepared non-aqueous electrolyte solution for a lithium secondary battery was injected.

Comparative Example 7

(Preparation of Non-Aqueous Electrolyte Solution for Lithium Secondary Battery)

A fluorine-based solvent was prepared by mixing 1,1,2,2-tetrafluoroethyl 2,2,3,3-tetrafluoropropyl ether and fluoroethylene carbonate in a weight ratio of 5:5 and dissolving $LiPF_6$ such that a concentration of the $LiPF_6$ was 1.2 M. A lithium secondary battery including a non-aqueous electrolyte solution was prepared in the same manner as in Example 1 except that the non-aqueous electrolyte solution for a lithium secondary battery was prepared by adding 1 g of the compound represented by Formula 2a to 99 g of the fluorine-based solvent (see Table 1 below).

Comparative Example 8

A non-aqueous electrolyte solution for a lithium secondary battery and a lithium secondary battery including the same were prepared in the same manner as in Example 1 except that lithium difluoro bis(oxalato) phosphate (LiDFOP), instead of the compound represented by Formula 2a, was added as a fluorine-based lithium compound (see Table 1 below).

Abbreviations of compounds in the following Table 1 respectively mean the followings.

TFETFPE: 1,1,2,2-tetrafluoroethyl 2,2,3,3-tetrafluoropropyl ether
FEC: fluoroethylene carbonate
F3-EMC: methyl 2,2,2-trifluoroethyl carbonate
3-FMP: methyl 3,3,3-trifluoropropionate
FB: monofluorobenzene
EC: ethylene carbonate
EMC: ethyl methyl carbonate
$LiBF_4$: lithium tetrafluoroborate

TABLE 1

| | \multicolumn{7}{c}{Non-aqueous electrolyte solution} | | | | | | | |
|---|---|---|---|---|---|---|---|
| | Lithium salt | | Fluorine-based mixed solvent | | | Fluorine-based solvent | |
| | Type | Concentration (M) | Fluorine-based linear ether | Fluorine-based cyclic carbonate | Weight ratio | Compound name | Weight ratio of fluorine-based mixed solvent:fluorine-based solvent |
| Example 1 | $LiPF_6$ | 1.2 | TFETFPE | FEC | 7:3 | — | — |
| Example 2 | $LiPF_6$ | 1.2 | TFETFPE | FEC | 7:3 | — | — |
| Example 3 | $LiPF_6$ | 1.2 | TFETFPE | FEC | 7:3 | — | — |
| Example 4 | $LiPF_6$ | 1.2 | TFETFPE | FEC | 7:3 | F3-EMC | 1:0.7 |
| Example 5 | $LiPF_6$ | 1.2 | TFETFPE | FEC | 7:3 | FB | 1:0.7 |
| Example 6 | $LiPF_6$ | 1.2 | TFETFPE | FEC | 7:3 | 3-FMP | 1:0.7 |
| Example 7 | $LiPF_6$ | 1.2 | TFETFPE | FEC | 7:3 | — | — |
| Example 8 | $LiPF_6$ | 1.2 | TFETFPE | FEC | 6:4 | — | — |
| Example 9 | $LiPF_6$ | 1.2 | TFETFPE | FEC | 9:1 | — | — |
| Example 10 | $LiPF_6$ | 1.2 | TFETFPE | FEC | 7:3 | — | — |
| Comparat. Example 1 | $LiPF_6$ | 1.2 | \multicolumn{3}{c}{EC/EMC (3:7)} | — | — |
| Comparat. Example 2 | $LiPF_6$ | 1.2 | \multicolumn{3}{c}{EC/EMC (3:7)} | — | — |
| Comparat. Example 3 | $LiPF_6$ | 1.2 | \multicolumn{3}{c}{TFETFPE:EC:EMC = 4:3:3} | — | — |
| Comparat. Example 4 | $LiPF_6$ | 1.2 | \multicolumn{3}{c}{TFETFPE:EC = 7:3} | — | — |
| Comparat. Example 5 | $LiPF_6$ | 1.2 | TFETFPE | FEC | 7:3 | — | — |
| Comparat. Example 6 | $LiPF_6$ | 1.2 | — | FEC | | F3-EMC | 1:0.7 |
| Comparat. Example 7 | $LiPF_6$ | 1.2 | TFETFPE | FEC | 5:5 | — | — |
| Comparat. Example 8 | $LiPF_6$ | 1.2 | TFETFPE | FEC | 7:3 | — | — |

| | Non-aqueous electrolyte solution | | | | |
|---|---|---|---|---|---|
| | Total amount of fluorine-based solvent (g) | \multicolumn{4}{c}{Additives} | | | |
| | | Fluorine-based lithium compound | Amount added (g) | Fluorinated compound | Amount added (g) |
| Example 1 | 99.9 | Formula 2a | 0.1 | — | — |
| Example 2 | 99 | Formula 2a | 1 | — | — |
| Example 3 | 97 | Formula 2a | 3 | — | — |
| Example 4 | 99 | Formula 2a | 1 | — | — |
| Example 5 | 99 | Formula 2a | 1 | — | — |
| Example 6 | 99 | Formula 2a | 1 | — | — |
| Example 7 | 97 | Formula 2a | 1 | $LiBF_4$ | 2 |
| Example 8 | 99 | Formula 2a | 1 | — | — |
| Example 9 | 99 | Formula 2a | 1 | — | — |
| Example 10 | 96 | Formula 2a | 4 | — | — |
| Comparat. Example 1 | 99 | Formula 2a | 1 | — | — |
| Comparat. Example 2 | 97 | Formula 2a | 1 | $LiBF_4$ | 2 |
| Comparat. Example 3 | 99 | Formula 2a | 1 | — | — |
| Comparat. Example 4 | 97 | Formula 2a | 1 | $LiBF_4$ | 2 |
| Comparat. Example 5 | 98 | — | — | $LiBF_4$ | 2 |

TABLE 1-continued

| | | | | | |
|---|---|---|---|---|---|
| Comparat. Example 6 | 97 | Formula 2a | 1 | LiBF$_4$ | 2 |
| Comparat. Example 7 | 99 | Formula 2a | 1 | — | — |
| Comparat. Example 8 | 99.9 | Lithium difluoro (bisoxalato)phosphate | 0.1 | — | — |

EXPERIMENTAL EXAMPLES

Experimental Example 1. High-Temperature Cycle Characteristics Evaluation

Each of the lithium secondary batteries prepared in Examples 1 to 10 and Comparative Examples 1 to 3 and 5 to 8 was charged at 0.7 C rate to 4.4 V under a constant current/constant voltage condition at 45° C., cut-off charged at 0.05 C, and discharged at 0.5 C to 3.0 V. The above charging and discharging were set as one cycle, 100 cycles were performed, and discharge capacity in the last 100$^{th}$ cycle was checked.

The discharge capacity of each lithium secondary battery obtained was expressed as a percentage (%) relative to theoretical design capacity (110 mAh) and listed in Table 2 below.

TABLE 2

| | Capacity (mAh) after 100 cycles, 45° C. | Capacity retention (%) |
|---|---|---|
| Example 1 | 99.9 | 90.8 |
| Example 2 | 102.9 | 93.5 |
| Example 3 | 98.1 | 89.2 |
| Example 4 | 104.7 | 95.2 |
| Example 5 | 104.3 | 94.8 |
| Example 6 | 103.0 | 93.6 |
| Example 7 | 105.3 | 95.7 |
| Example 8 | 101.1 | 91.9 |
| Example 9 | 97.7 | 88.8 |
| Example 10 | 96.1 | 87.4 |
| Comparative Example 1 | 85.4 | 77.6 |
| Comparative Example 2 | 90.3 | 82.1 |
| Comparative Example 3 | 93.5 | 85.0 |
| Comparative Example 5 | 95.5 | 86.8 |
| Comparative Example 6 | 88.2 | 80.2 |
| Comparative Example 7 | 87.5 | 79.5 |
| Comparative Example 8 | 94.2 | 85.6 |

As illustrated in Table 2, with respect to the secondary batteries of Examples 1 to 10, it may be understood that capacity retentions were all excellent, at about 87.4% or more. In contrast, the secondary batteries of Comparative Examples 1 to 3 and 5 to 8 mostly had a capacity retention of 86.8% or less, wherein it may be confirmed that the capacity retentions were reduced in comparison to those of the secondary batteries of Examples 1 to 10.

With respect to the secondary battery of Example 10 which included the non-aqueous electrolyte solution containing an excessive amount of the compound of Formula 2a, it may be understood that the cycle capacity retention was slightly reduced in comparison to those of the secondary batteries of Examples 1 to 9.

Experimental Example 2. High-Temperature Storage Characteristics Evaluation

Each of the lithium secondary batteries prepared in Examples 1 to 10 and Comparative Examples 1 to 8 was charged at 0.7 C rate to 4.4 V under a constant current/constant voltage condition and cut-off charged at 0.05 C once, and each lithium secondary battery was stored for 8 hours in an oven at 85° C. Next, each lithium secondary battery was discharged at 0.2 C rate to 3.0 V at 25° C., and capacity was then measured.

Capacity retentions obtained were expressed as a percentage (%) relative to the theoretical design capacity (110 mAh) and listed in Table 3 below.

TABLE 3

| | Capacity (mAh) after storage at 85° C. | Capacity retention (%) |
|---|---|---|
| Example 1 | 95.3 | 86.6 |
| Example 2 | 98.1 | 89.2 |
| Example 3 | 97.8 | 88.9 |
| Example 4 | 99.4 | 90.4 |
| Example 5 | 101.5 | 92.3 |
| Example 6 | 98.6 | 89.6 |
| Example 7 | 99.7 | 90.6 |
| Example 8 | 94.4 | 85.8 |
| Example 9 | 100.8 | 91.6 |
| Example 10 | 95.8 | 87.1 |
| Comparative Example 1 | 82.7 | 75.2 |
| Comparative Example 2 | 84.8 | 77.1 |
| Comparative Example 3 | 89.4 | 81.3 |
| Comparative Example 4 | 92.2 | 83.8 |
| Comparative Example 5 | 93.6 | 85.1 |
| Comparative Example 6 | 75.0 | 68.2 |
| Comparative Example 7 | 70.1 | 63.7 |
| Comparative Example 8 | 92.3 | 83.9 |

As illustrated in Table 3, with respect to the secondary batteries of Examples 1 to 10, it may be understood that capacity retentions after high-temperature storage were all excellent, at about 85.8% or more.

In contrast, the secondary batteries of Comparative Examples 1 to 8 mostly had a capacity retention after high-temperature storage of 85.1% or less, wherein it may be confirmed that the capacity retentions after high-temperature storage were reduced in comparison to those of the secondary batteries of Examples 1 to 10.

With respect to the secondary battery of Example 10, which included the non-aqueous electrolyte solution containing the excessive amount of the compound of Formula 2a, and the secondary battery of Example 1 which included the non-aqueous electrolyte solution containing a small amount of the compound of Formula 2a, it may be understood that the cycle capacity retentions were slightly reduced in comparison to those of the secondary batteries of Examples 2 to 7 and 9.

Since FEC, as a fluorine-based cyclic carbonate solvent, has a function of forming a film on the negative electrode, an improvement in performance due to an increase in the amount of the FEC may be expected for the lithium secondary battery of Example 8, which included the non-aqueous electrolyte solution having a large amount of the FEC, in the life characteristics evaluation as in Experimental Example 1. However, since it is disadvantageous in that the generation of $CO_2$ gas is increased due to easy decomposition of the FEC when the FEC is exposed to a high temperature for a long period of time during high-temperature storage, it may be understood that the capacity retention during high-temperature storage of the lithium secondary battery of Example 8, which included the non-aqueous electrolyte solution having the large amount of the FEC, was somewhat inferior to those of the lithium secondary batteries of Examples 1 to 7 and 9.

The invention claimed is:

1. A non-aqueous electrolyte solution for a lithium secondary battery, the non-aqueous electrolyte solution comprising:
   a lithium salt;
   a fluorine-based linear ether solvent represented by Formula 1;
   a fluorine-based cyclic carbonate solvent; and
   a fluorine-based lithium compound represented by Formula 2a,
   wherein the fluorine-based linear ether solvent and the fluorine-based cyclic carbonate solvent are present in a weight ratio of 6:4 to 9:1,

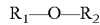  [Formula 1]

wherein, in Formula 1,
   $R_1$ and $R_2$ are each independently an alkyl group having 1 to 10 carbon atoms which is unsubstituted or substituted with fluorine, wherein at least one of $R_1$ and $R_2$ is an alkyl group having 1 to 10 carbon atoms which is substituted with fluorine,

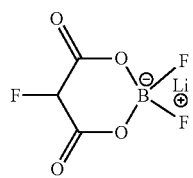  [Formula 2a]

2. The non-aqueous electrolyte solution for a lithium secondary battery of claim 1, wherein, in Formula 1, $R_1$ and $R_2$ are each independently an alkyl group having 2 to 8 carbon atoms which is unsubstituted or substituted with fluorine, wherein at least one of $R_1$ and $R_2$ is an alkyl group having 2 to 8 carbon atoms which is substituted with fluorine.

3. The non-aqueous electrolyte solution for a lithium secondary battery of claim 2, wherein, in Formula 1, $R_1$ and $R_2$ are each independently an alkyl group having 2 to 5 carbon atoms which is unsubstituted or substituted with fluorine, wherein at least one of $R_1$ and $R_2$ is an alkyl group having 2 to 5 carbon atoms which is substituted with fluorine.

4. The non-aqueous electrolyte solution for a lithium secondary battery of claim 1, wherein the fluorine-based linear ether solvent comprises at least one 1,1,2,2-tetrafluoroethyl 2,2,2-trifluoroethyl ether, 1,1,2,2-tetrafluoroethyl 2,2,3,3-tetrafluoropropyl ether, or 1H, 1H, 5H-octafluoropentyl 1,1,2,2-tetrafluoroethyl ether.

5. The non-aqueous electrolyte solution for a lithium secondary battery of claim 1, wherein the fluorine-based linear ether solvent comprises 1,1,2,2-tetrafluoroethyl 2,2,3,3-tetrafluoropropyl ether.

6. The non-aqueous electrolyte solution for a lithium secondary battery of claim 1, wherein the fluorine-based cyclic carbonate solvent comprises fluoroethylene carbonate or difluoroethylene carbonate.

7. The non-aqueous electrolyte solution for a lithium secondary battery of claim 1, wherein the fluorine-based cyclic carbonate solvent comprises fluoroethylene carbonate.

8. The non-aqueous electrolyte solution for a lithium secondary battery of claim 1, wherein the fluorine-based linear ether solvent and the fluorine-based cyclic carbonate solvent are present in a weight ratio of 7:3 to 9:1.

9. The non-aqueous electrolyte solution for a lithium secondary battery of claim 1, wherein the fluorine-based lithium compound is present in an amount of 0.05 wt % to 3.0 wt % based on a total weight of the non-aqueous electrolyte solution.

10. The non-aqueous electrolyte solution for a lithium secondary battery of claim 1, further comprising at least one fluorine-based solvent of a fluorine-based linear carbonate solvent, a fluorine-based dioxolane solvent, a fluorine-based phosphite solvent, a fluorine-based phosphate solvent, a fluorine-based benzene solvent, a fluorine-based cyclic ether solvent, a fluorine-based propionate solvent, or a fluorine-based acetate solvent.

11. The non-aqueous electrolyte solution for a lithium secondary battery of claim 10, wherein a weight ratio of a mixed solvent of the fluorine-based linear ether solvent and the fluorine-based cyclic carbonate solvent to the fluorine-based solvent is in a range of 1:0.7 to 1:1.

12. The non-aqueous electrolyte solution for a lithium secondary battery of claim 1, further comprising at least one fluorinated compound of a fluorinated nitrile-based compound, a fluorinated lithiated phosphate-based compound, or a fluorinated lithiated borate-based compound.

13. A lithium secondary battery comprising the non-aqueous electrolyte solution of claim 1.

* * * * *